US009577820B2

(12) United States Patent
Mu et al.

(10) Patent No.: US 9,577,820 B2
(45) Date of Patent: Feb. 21, 2017

(54) ELASTIC GEAR FIRST-IN-FIRST-OUT BUFFER WITH FREQUENCY MONITOR

(71) Applicant: Avago Technologies General IP (Singapore) Pte. Ltd., Singapore (SG)

(72) Inventors: Linna Mu, Singapore (SG); Hock Koon Lee, Singapore (SG); Yong Wei Tay, Singapore (SG)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 36 days.

(21) Appl. No.: 14/613,189

(22) Filed: Feb. 3, 2015

(65) Prior Publication Data

US 2016/0226655 A1 Aug. 4, 2016

(51) Int. Cl.
*H04L 7/00* (2006.01)

(52) U.S. Cl.
CPC ................... *H04L 7/005* (2013.01)

(58) Field of Classification Search
CPC ..... G06F 1/04; G06F 1/06; G06F 1/12; G06F 5/06; G06F 13/38; G11C 8/18; H03K 19/00; H03L 7/00; H04L 7/00; H04L 7/02; H04L 7/005; H04L 12/50; H04L 25/40; H04L 27/00; H04Q 11/00
USPC ............ 326/93; 327/145; 365/194; 375/354, 375/357, 359, 371, 372; 710/52, 58, 70; 713/400, 500, 501, 600; 714/11, 12
See application file for complete search history.

(56) References Cited

U.S. PATENT DOCUMENTS

| 7,352,836 B1* | 4/2008 | Mendenhall | G06F 5/06 370/304 |
| --- | --- | --- | --- |
| 8,742,986 B2 | 6/2014 | Ameti et al. | |
| 2005/0058148 A1* | 3/2005 | Castellano | G06F 5/12 370/428 |
| 2006/0120498 A1* | 6/2006 | Wong | H04L 7/0012 375/359 |
| 2007/0220184 A1* | 9/2007 | Tierno | G06F 5/12 710/52 |
| 2008/0141063 A1* | 6/2008 | Ridgeway | G06F 5/12 713/501 |
| 2008/0288805 A1* | 11/2008 | Osborn | G06F 5/06 713/400 |
| 2011/0116337 A1* | 5/2011 | Hay | G06F 5/10 365/233.11 |
| 2011/0204932 A1* | 8/2011 | Cortadella | G06F 7/00 327/145 |
| 2011/0213944 A1* | 9/2011 | Guarnaccia | G06F 13/4059 711/167 |

(Continued)

OTHER PUBLICATIONS

Clifford E. Cummings, "Simulation and Synthesis Techniques for Asynchronous FIFO Design", Sunburst Design, Expert Verilog, System Verilog & Synthesis Training, SNUG San Jose, 2002, 23 pages.

(Continued)

*Primary Examiner* — Shawkat M Ali

(57) ABSTRACT

An elastic gear First-In-First-Out (FIFO) buffer architecture is disclosed. The proposed elastic gear FIFO buffer uses a frequency monitor unit to control clock frequency compensation. By using an independent frequency monitor unit, the data latency and FIFO buffer size are best optimized. An elastic gear FIFO could be utilized in applications where clock compensation and asynchronous data width conversion are desired or required.

20 Claims, 6 Drawing Sheets

(56) References Cited

U.S. PATENT DOCUMENTS

| | | | | |
|---|---|---|---|---|
| 2013/0254583 | A1* | 9/2013 | Rifani | G06F 13/38 |
| | | | | 713/400 |
| 2014/0250260 | A1* | 9/2014 | Yap | G06F 12/0246 |
| | | | | 711/103 |
| 2014/0325107 | A1* | 10/2014 | Iwatsuki | G06F 1/10 |
| | | | | 710/124 |

OTHER PUBLICATIONS

Joe Winkles, "Elastic Buffer Implementations in PCI Express Devices", MindShare, Inc., Nov. 2003, 16 pages.

* cited by examiner

ELASTIC GEAR FIRST-IN-FIRST-OUT BUFFER WITH FREQUENCY MONITOR

FIELD OF THE DISCLOSURE

The present disclosure is generally directed systems and methods for passing data from one computing or input/output subsystem to another.

BACKGROUND

Computing and Input/Output (I/O) subsystems often need to pass data to each other. First-In-First-Out (FIFO) buffers are often used to safely pass data from one subsystem to another. The implementation of the FIFOs is straightforward when both subsystems use the same clock domain or same data width.

When the subsystems use different port widths and different data width, things become more complicated. An elastic gear FIFO design is often required in such circumstances. Conventional asynchronous gear FIFO buffer design is composed of an asynchronous FIFO buffer design and a synchronous gear FIFO buffer. Asynchronous FIFO buffer designs usually have $2^k$ locations. In such a design, the write pointer is converted to gray code and then synchronized to the read clock domain before being compared to the read pointer. Clock frequency compensation, FIFO full, and FIFO empty all depend on the pointer difference between the synchronized write pointer and read pointer. This constrains the asynchronous FIFO buffer design to have the same input and output data width. An additional synchronous gear FIFO buffer converter is often required to do the data width conversion that is necessary. Implementing an asynchronous gear FIFO buffer with another asynchronous FIFO buffer plus a synchronous gear FIFO buffer are not area effective and introduce unwanted data latency.

BRIEF DESCRIPTION OF THE DRAWINGS

The present disclosure is described in conjunction with the appended FIGS., which are not necessarily drawn to scale.

DETAILED DESCRIPTION

Figure 1:
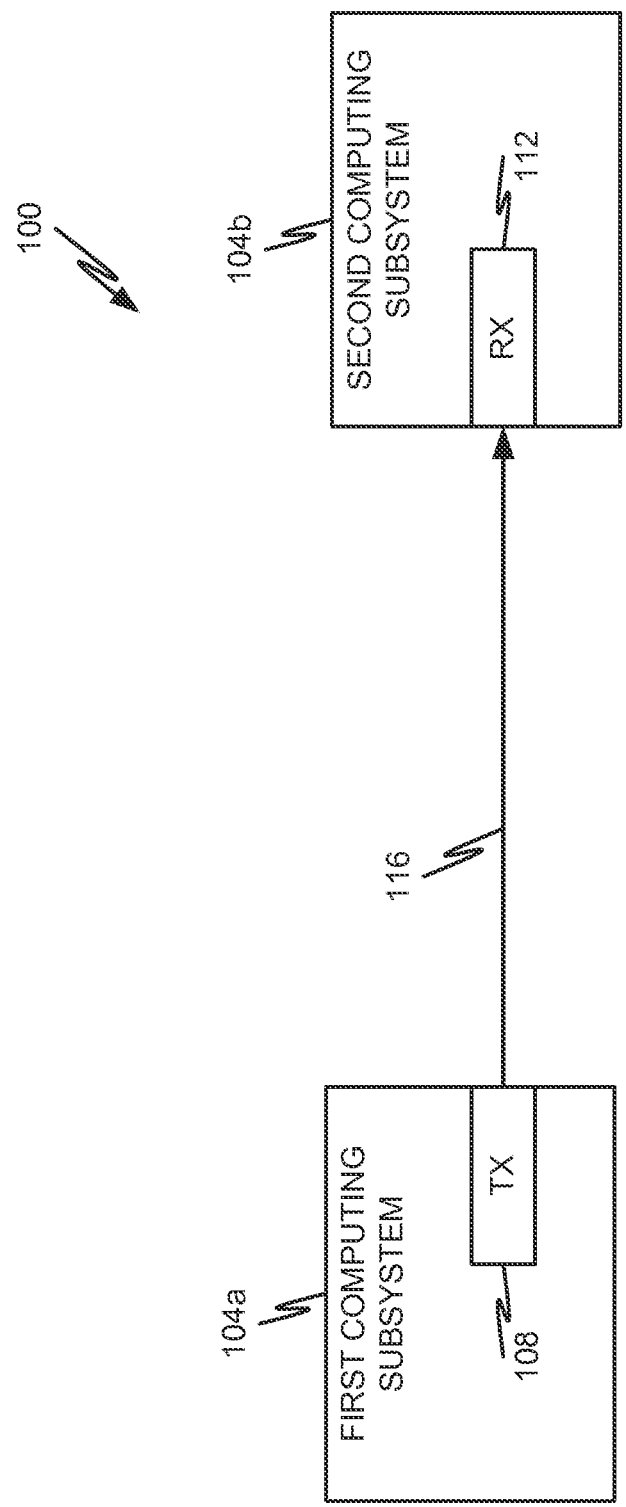
FIG. 1 is a block diagram depicting a computing system in accordance with embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

While embodiments of the present disclosure will be described in connection with a particular type of buffer architecture, it should be appreciated that embodiments of the present disclosure are not so limited. In particular, the concepts disclosed herein can be used in a number of different environments where the transfer of data between two components, which may or may not be operating at the same or different clock frequencies and/or which may or may not have different data width requirements. A FIFO buffer is but one of many types of buffers or similar devices that can benefit from the concepts disclosed herein.

A desirable elastic gear FIFO buffer design supports the following features: (1) the ratio of the input and output port widths is not required to be an integer; (2) transfer data with minimal latency; (3) simple addressing and controlling logic design (so that circuit needed to implement the buffer can be small and can operate at higher clock frequency); and (4) clock frequency compensation with minimum FIFO buffer size.

Accordingly, the proposed asynchronous gear FIFO buffer with frequency monitor unit(s) employs a simple-to-implement architecture to best meet all the design requirements described above. It ensures easy data alignment at both the input port and the output port of the FIFO. There is no limitation on the ratio of the input port and output port widths. The clock compensation is managed cleanly and efficiently with an optimized FIFO depth.

More specifically, an elastic gear FIFO buffer is disclosed that interfaces between asynchronous clock domains. The elastic gear FIFO buffer supports different read and write clock frequencies and/or different read and write data width. The proposed elastic gear FIFO buffer is also able to perform clock frequency compensation by adjusting pointer movement in the data stream where the application allows.

One aspect of the present disclosure is to provide an elastic reset module to control the FIFO buffer's initialize virtual depth. The virtual depth is configurable so that the data latency through the FIFO buffer is optimized based on the gear data width conversion and the clock frequency tolerance design requirements.

Another aspect of the present disclosure is to provide a frequency monitor module capable of monitoring the clock frequency difference between local and remote reference clock of a PCIe interface. The disclosed frequency monitor module is then capable of deciding whether and to what extent the write and/or read pointer should be incremented based on the clock frequency difference and the FIFO virtual depth.

Referring now to FIG. 1, a computing system 100 will be described in accordance with at least some embodiments of the present disclosure. The system 100 is shown to include one or more computing subsystems 104a, 104b. Although the first computing subsystem 104a is shown as only having a transmitter 108 and the second computing subsystem 104b is shown as only having a receiver 112, it should be appreciated that one or both of the computing subsystems 104a, 104b may each comprise a transmitter 108 and a receiver 112. The depiction of a one-way communication system 100 is for ease of discussion and it not intended to limit the scope of the present disclosure. The computing subsystems 104a, 104b may correspond to computing subsystems physically separated from one another by a communication network or they may correspond to subsystems of a common computing system 100 that are separated by a communication bus, a communication channel, or the like. In particular, the subsystems 104a, 104b are shown to communicate with one another via a communication channel 116 that connects a transmitter 108 with a receiver 112. It should be appreciated that embodiments of the present disclosure may also be implemented in a communication system having dedicated transmitters 108 and receivers 112 instead of a combination of a transmitter 108 and receiver 112 being implemented in a transceiver 104.

In some embodiments, the communication channel 116 may carry an analog or digital signal. Alternatively or additionally, the communication channel 116 may carry one or more packets of data from the transmitter 108 to the receiver 112. The communication channel 116 may include a wired communication medium (e.g., a physical wire, coaxial cable, fiber-optics, etc.), a wireless communication medium (e.g., air), or a combination of wired and wireless media. It should be appreciated that the communication channel 116 may traverse long or short distances. For instance, the communication channel 116 may correspond to a short interconnection between components on an IC chip. In some embodiments, the communication channel 116 may correspond to memory channel between a memory chip and a memory controller. As another example, the communication channel 116 may correspond to a long interconnection (e.g., on the order of miles) between a transmitting station and a receiving station.

Figure 2:
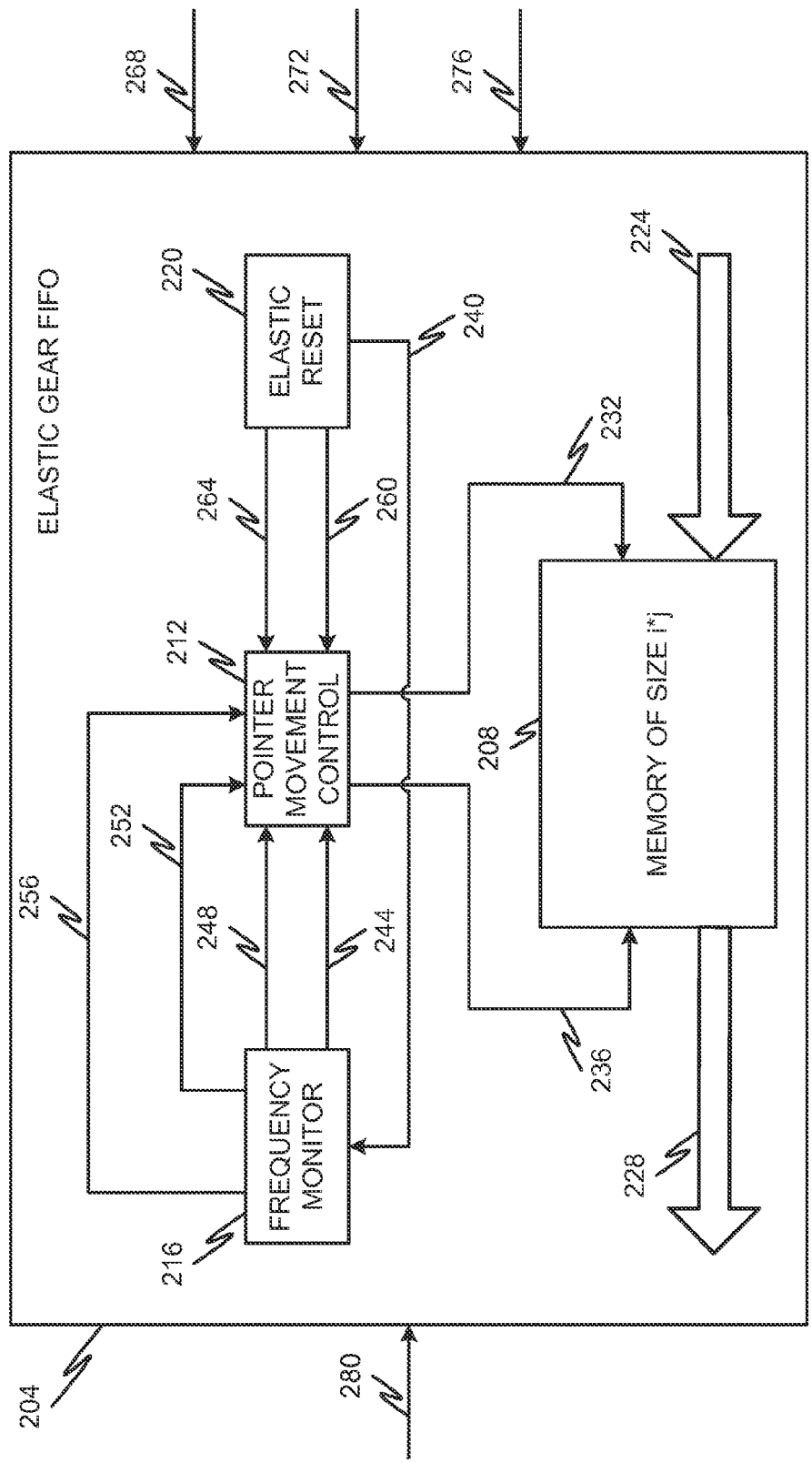
FIG. 2 is a block diagram depicting an elastic gear FIFO buffer in accordance with at least some embodiments of the present disclosure.

With reference now to FIG. 2, an elastic gear FIFO buffer 204 (also referred to herein as "elastic gar FIFO") will be described in accordance with embodiments of the present disclosure. The elastic gear FIFO buffer 204 may correspond to a component of the communication system 100 that enables data to travel from one computing subsystem (e.g., the first computing subsystem 104a) to another computing subsystem (e.g., the second computing subsystem 104b). The elastic gear FIFO buffer 204 may be an integral component of the transmitter 108, an integral component of the receiver 112, an integral component of the communication channel 116, a separate component of the system 100, or may be distributed among many components of the system 100. In some embodiments, the elastic gear FIFO buffer 204 is used to carry data from one data source (e.g., computer memory) in the form of the first computing subsystem 104a to a data consumer (e.g., a microprocessor) in the form of the second computing subsystem 104b. In some embodiments, the elastic gear FIFO buffer 204 is implemented on a single piece of silicon.

Data passes through the elastic gear FIFO buffer 204 via the memory 208. In particular, write data 224 of width j is provided to the memory 208 from the transmitter 108. Data is then read out of the memory 208 as read data 228 of width k. It should be appreciated that the width of write data 224 (e.g., value "j") may or may not be the same as the width of the read data 228 (e.g., value "k"). As suggested by the name, data 224 written to memory 208 is read 228 out of memory 208 on a First-In-First-Out basis, hence the naming of the elastic gear FIFO buffer. With further respect to the size of memory 208, which can be of size i*j, "i" may correspond to an integer value greater than or equal to one that is based on the FIFO size requirements. More specifically, the memory size 208 may correspond to a multiple of the write data 224 width (e.g., value "j") with consideration of the following factors: (1) FIFO start-up buffering; (2) overflow/underflow; and (3) clock frequency compensation tolerance. Advantageously, the elastic gear FIFO buffer 204 supports different read and write clock frequencies, which means that the first computing subsystem 104a may be operating at a first clock frequency whereas the second computing subsystem 104b may be operating at a second clock frequency that is different from the first clock frequency. Also advantageously, the elastic gear FIFO buffer 204 may support different read and write data widths (e.g., "j" does not necessarily need to equal "k").

When the clock frequencies of the computing subsystems 104a, 104b are different and/or the read and write data widths are not the same, a write pointer 232 and/or read pointer 236 may be actuated by a pointer movement control 212 of the elastic gear FIFO buffer 204. The pointer movement control 212 is configured to adjust the write pointer 232 and/or read pointer 236 to help dynamically adjust the operation of memory 208 and balance the write data 224 with the read data 228. In some embodiments, the pointer movement control 212 adjusts the write and read pointers 232, 236 based on inputs from a frequency monitor 216 and/or an elastic reset 220. The frequency monitor may provide multiple inputs to the pointer movement control 212 as shown in FIG. 2. As some non-limiting examples, the frequency monitor 216 may provide the pointer movement control 212 with an empty signal 244, a full signal 248, a read pointer move signal 252, and/or a write pointer move signal 256.

The elastic reset 220 may provide the pointer movement control 212 with one or more inputs such as a write pointer reset signal 260 and/or a read pointer reset signal 264. Furthermore, the elastic reset 220 may communicate directly with the frequency monitor 216 by providing a virtual depth input signal 240. Based on inputs received at the elastic gear FIFO buffer 204, the frequency monitor 216 and/or elastic reset 220 may instruct the pointer movement control 212 to adjust and/or increment the write pointer 232 and/or read pointer 236 of the memory 208. The inputs that may be considered by the frequency monitor 216 and/or elastic reset 220 include, without limitation, a FIFO threshold input 268, a FIFO reset input 272, a write clock input 276, and a read clock input 280. The write clock input 276 may provide the components of the elastic gear FIFO buffer 204 with information about the current clock frequency of the first computing subsystem 104a. Likewise, the read clock input 280 may provide the components of the elastic gear FIFO buffer 204 with information about the current clock frequency of the second computing subsystem 104b. While clock frequency may be represented as time, it should be appreciated that clock frequencies can also be represented in other units (e.g., symbol frequency, clock cycles, multiples of clock cycles, etc.) without departing from the scope of the present disclosure. The FIFO threshold 268 and/or FIFO reset input 272 may correspond to external input commands received from an external controller of the elastic gear FIFO buffer 204. The input commands may be generated automatically (e.g., in response to a predetermined event occurring or time expiring) or manually (e.g., under command from a human user).

Figure 3:
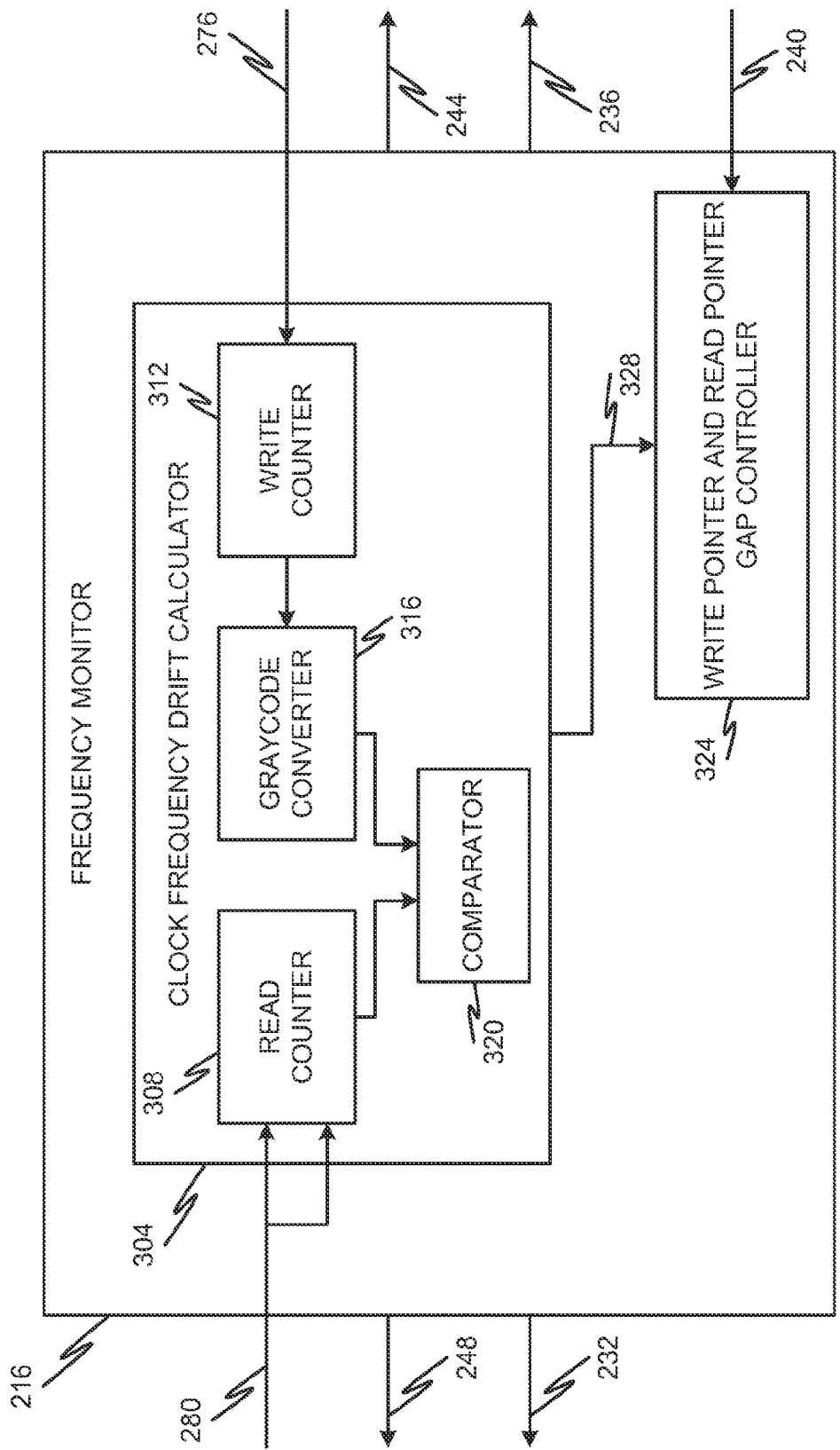
FIG. 3 is a block diagram depicting details of a frequency monitor in accordance with at least some embodiments of the present disclosure.
Figure 4:
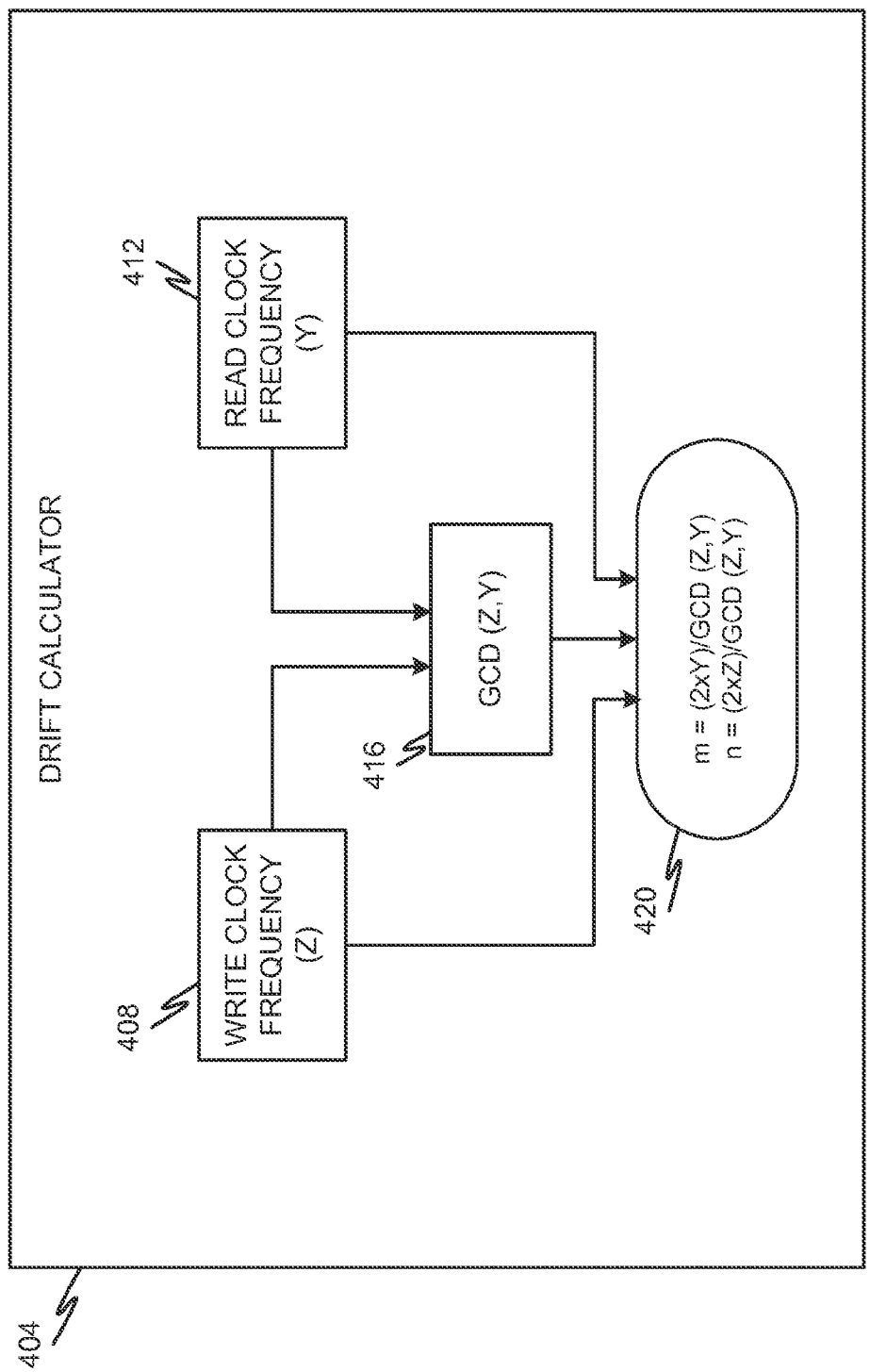
FIG. 4 is a block diagram depicting details of a drift calculator in accordance with at least some embodiments of the present disclosure.

With reference now to FIGS. 3 and 4, additional details of a frequency monitor 216 will be described in accordance with at least some embodiments of the present disclosure. The frequency monitor 216 is shown to include a clock frequency drift calculator 304 having a read counter 308, a write counter 312, a graycode converter 316, and a comparator 320. The frequency monitor 216 is also shown to include a write pointer and read pointer gap controller 324. Consistent with FIG. 2, the inputs to the frequency monitor 216 include the write clock input 276, the read clock input 280, and the virtual depth input signal 240. The virtual depth input signal 240 is fed directly to the write pointer and read pointer gap controller 324 whereas the write clock input 276 and read clock input 280 are first processed by the clock frequency drift calculator 304 before being used as input to the write pointer and read pointer gap controller 324. More specifically, the write pointer and read pointer gap controller 324 may be configured to utilize input from the clock frequency drift calculator 304 in the form of a gap move request input 328 in addition to the virtual depth input signal 240 to determine whether the writer pointer move input 256 and/or read pointer move input 252 should be provided to the pointer movement control 212, thereby causing the pointer movement control 212 to increment the write pointer 232 or read pointer 236 for the memory 208. The write pointer and read pointer gap controller 324 may correspond to the control module of the frequency monitor 216 that performs the analysis functions of the frequency monitor 216 and sends instructions (e.g., outputs) based on the analysis performed thereby.

As mentioned above, the write pointer and read pointer gap controller 324 may utilize inputs from the clock frequency drift calculator 304 to determine whether a read pointer and/or write pointer should be moved via signals 252 and/or 256. In operation, the clock frequency drift calculator 304 utilizes the read counter 308 and write counter 312 to track the clock frequencies of the computing subsystems 104*a*, 104*b* that are connected by the elastic gear FIFO buffer 204. In particular, the write counter 312 may be used to receive the write clock input signal 276 from the transmitter 108 or the first computing subsystem 104*a* whereas the read counter 308 may be used to receive the read clock input signal 280 from the receiver 112 or the second computing subsystem 104*b*. The write counter 312 may be configured to count from 0 to (m−1) and increase its counter by one in correspondence with every write clock cycle. Similarly, the read counter 308 may be configured to count from 0 to (n−1) and increase its counter by one in correspondence with every read clock cycle. FIG. 4 shows additional details of the drift calculator 404 that may be used to track the drift between the write clock frequency 408 (e.g., "Z") and the read clock frequency 412 (e.g., "Y"). In some embodiments, m and n may be calculated by a drift calculation module 420 as follows:

Write clock frequency=Z
Read clock frequency=Y $$m=(2\times Y)/GCD(Z,Y)$$

$$n=(2\times Z)/GCD(Z,Y)$$

The drift calculation module 420 may utilize inputs from the write clock frequency 408, the read clock frequency 412, and a greatest common divider calculation 416, where the GCD (Z,Y) may correspond to the greatest common divider of Z and Y. The drift calculator 404 may be included as part of the clock frequency drift calculator 304 (e.g., within the comparator 320) or it may be a separate component of the clock frequency drift calculator 304.

In operation, the write counter 312 output may be mapped to graycode or reduced graycode using a graycode converter 316 before being compared with the read counter 308 output. The graycode converter 316 may utilize any known or yet-to-be-developed type of graycode conversion to transfer the write clock domain to the read clock domain. Alternatively or additionally, the read clock domain could be transferred to the write clock domain or both the read and write clock domains could be transferred to another domain prior to comparison.

After the write counter is transferred to the read clock domain (or vice versa) by the graycode converter 316, the values of the write counter 312 output and read counter 308 output can be evaluated (e.g., compared by comparator 320) every time the read pointer reaches zero. Clock frequency drift calculations can be computed by the write and read pointer gap changes. In some embodiments, the read counter 308 counts from 0 to n−1 while the write counter 312 counts from 0 to m−1. In other words, m corresponds to the full count of write counter 312 and n corresponds to the full count of the read counter 308. Essentially, write counter 312 will count like the following: 0, 1, 2, 3, . . . m−3, m−2, m−1, 0, 1, 2, 3, . . . m−3, m−2, m−1, etc. Meanwhile, the read counter 308 will count like the following: 0, 1, 2, 3, . . . n−3, n−2, n−1, 0, 1, 2, 3, . . . n−3, n−2, n−1, etc.

If there is no clock drift present, then the read counter 308 and write counter 312 will both be 0 at the same time. This mechanism does not compare m and n because both sides step differently (e.g., due to different clock frequency). Thus, the comparator 320 only compares at the common end point, that is when read counter and write counter finish one round of counting (e.g., reach 0). Thus, when the read counter 308 reaches 0, the write counter 312 should also reach 0; otherwise, there is a frequency drift and action required. In particular, the clock frequency drift calculator 304 may utilize the following rules to determine whether a gap move request signal 328 should be provided to the write pointer and read pointer gap controller 324:

- If write counter (post graycode conversion) is in the balance range of, for example, (m−1, 0, 1), then no change to the gap
- If the write counter (post graycode conversion) is in the slow range of, for example (<m−1 AND>m/2), then gap decrease by one and read counter halt increment for one clock cycle
- If write counter is in the balance range (post graycode conversion) of, for example (>1 AND<m/2), then gap increase by one and read counter increased by two The gap movement request signal 328 combined with the FIFO capacity (e.g., virtual depth input signal 240) is used by the write pointer and read pointer gap controller 324 to determine whether there is a need to increase or halt write and/or read pointers to balance the FIFO data flow. When the write pointer is increased but the read pointer is halted, the gap between the two is increased accordingly. When the write pointer is halted but the read pointer is increased, the gap between the two is decreased accordingly.

Figure 5:
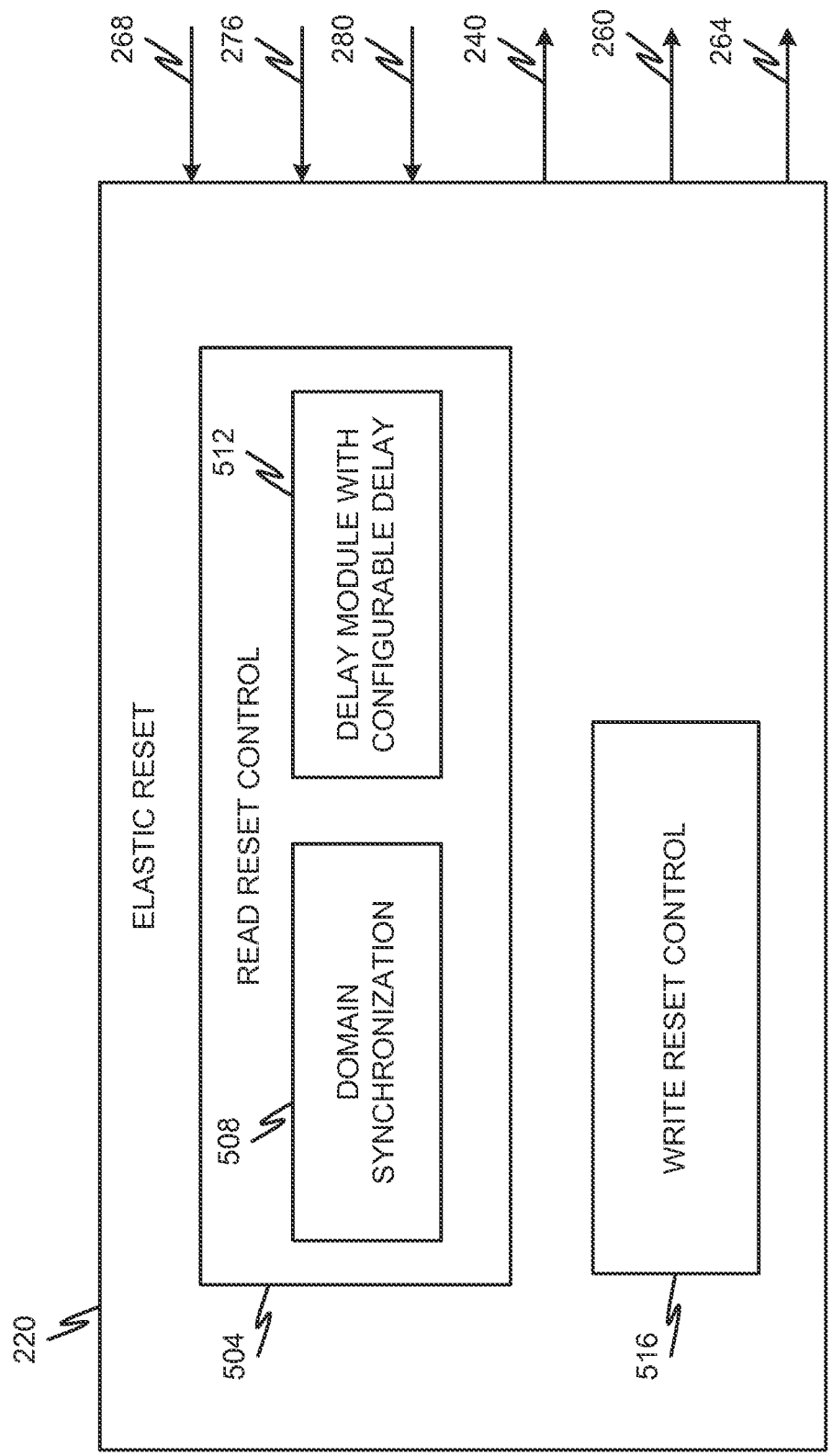
FIG. 5 is a block diagram depicting details of an elastic reset in accordance with at least some embodiments of the present disclosure.

With reference now to FIG. 5, further details of the elastic reset 220 (which may also be referred to herein as "the elastic reset module") will be described in accordance with at least some embodiments of the present disclosure. The elastic reset module 220 is shown to include a read reset control module 504 that includes a domain synchronization module 508 and a delay module 512. The elastic reset module 220 is also shown to include a write reset control 516. The elastic reset module 220 is configured to initialize the FIFO virtual depth via the virtual depth input 240. Initialization of the virtual depth can depend upon the application requirement and other design considerations. They delay on the read pointer reset 504 may be configurable according to user preferences and may be controlled by the delay module 512. The domain synchronization module 508 may be used by the elastic reset module 220 to help synchronize the read and write domains based on knowledge of the write clock 276 and read clock 280. Read reset control 504 may correspond to the portion of the elastic reset module 220 that outputs the read pointer reset signal 264. The write reset control 516 may be used to provide the write pointer reset signal 260 when the elastic reset module 220 determines that such a reset is required.

Compared to conventional FIFO architectures, the proposed architecture removes the dependency of the FIFO balancing control from the read and write pointer value. The proposed FIFO architecture introduces a new way of FIFO balancing based on frequency monitoring and FIFO initialization virtual depth. This provides the advantage of reduced FIFO size and optimized data latency. Said another way, the proposed elastic gear FIFO buffer 204 is configured to change the depth of the memory (e.g., how much data should be kept in memory 208) before being reset by the elastic reset module 220. Prior art FIFO architectures only monitor whether memory is full and have no regard for the frequency differences that may contribute to whether and how much the memory is filling, emptying, or maintaining a balance.

Figure 6:
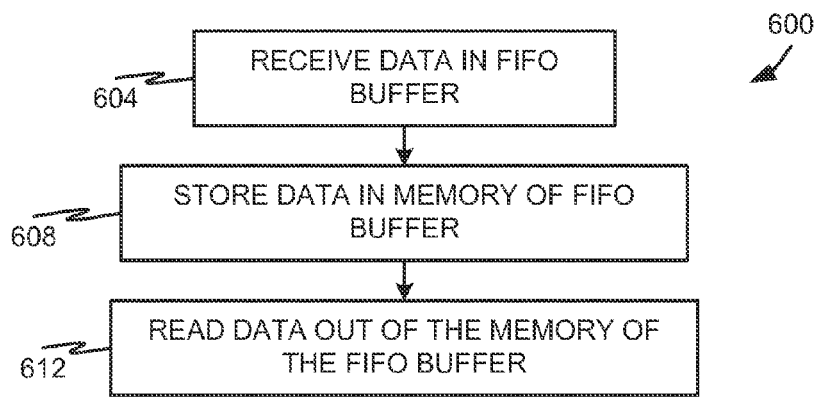
FIG. 6 is a flow diagram depicting a method of utilizing an elastic gear FIFO buffer in accordance with embodiments of the present disclosure.

With reference now to FIG. 6, a method 600 of using an elastic gear FIFO buffer 204 to transfer data from a first computing subsystem 104a to a second computing subsystem 104b will be described in accordance with at least some embodiments of the present disclosure. The method 600 begins by receiving data in the memory 208 of the FIFO buffer 204 (step 604). The data provided to memory 208 may correspond to data transmitted by the transmitter 108 of the first computing subsystem 104a. The data received in step 604 is then stored in the memory 208 for a predetermined amount of time (step 608). Thereafter, the data is read out of memory 208 by the second computing subsystem 104b (step 612). In particular, the data is read out of memory on a First-In-First-Out basis.

Figure 7:
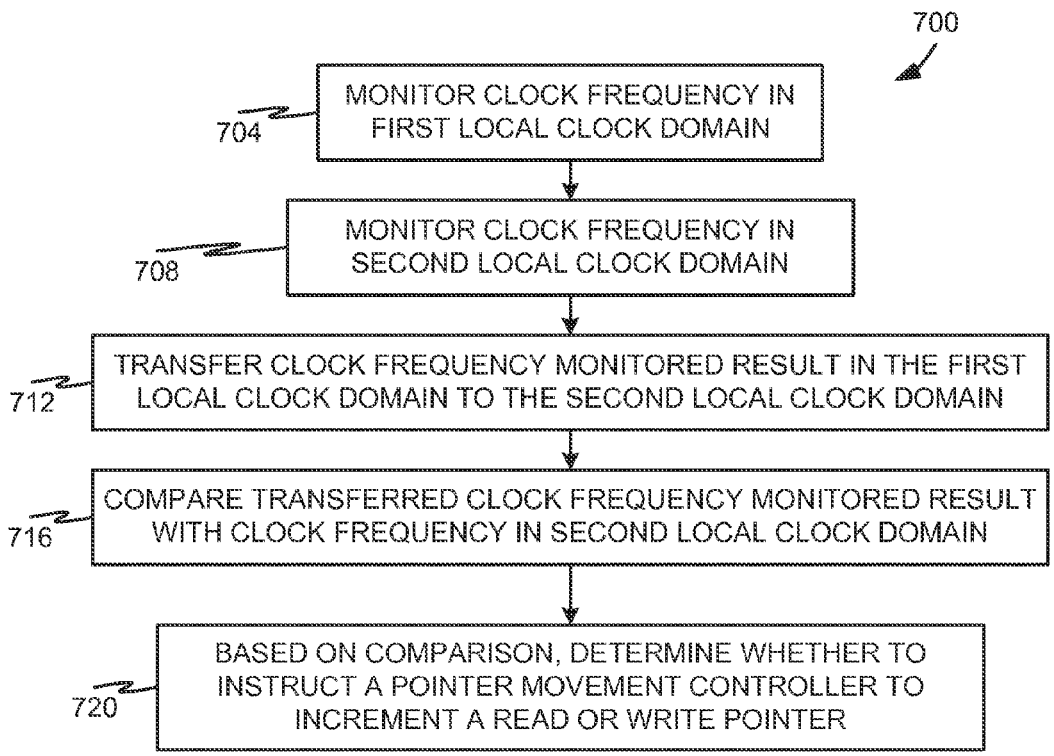
FIG. 7 is a flow diagram depicting a method of controlling pointer movement in accordance with embodiments of the present disclosure.

With reference now to FIG. 7, a method of controlling pointer movement in an elastic gear FIFO buffer 204 will be described in accordance with at least some embodiments of the present disclosure. The method 700 begins by monitoring the clock frequency in a first local clock domain (step 704). In some embodiments, the first local clock domain may correspond to a clock domain of the transmitter 108 (e.g., the first computing subsystem 104a) of the data to the FIFO buffer 204. Simultaneous with step 704, the method also monitors the clock frequency of a second local clock domain (step 708). The second local clock domain may correspond to a clock domain of the receiver 112 (e.g., the second computing subsystem 104b) of the data from the FIFO buffer 204.

The method 700 continues by transferring a clock frequency monitored value (e.g., a count value) of one domain to the other domain (step 712). In some embodiments, this may correspond to transferring a monitored value obtained from first clock frequency to the second clock frequency. This transfer may be done by converting the first clock frequency monitored value to gray code or using any other known transfer process.

The transferred value and a monitored value from the other domain (e.g., the second clock frequency) are then compared with one another (step 716) so that it can be determined whether or not to instruct a pointer movement (e.g., movement of a read and/or write pointer) to increment the pointer of the memory 208 (step 720). Incrementing the read and/or write pointer can help the elastic gear FIFO buffer 204 accommodate different clock frequencies and/or varying data widths.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. An elastic gear First-in-First-out (FIFO) buffer, comprising:
    an input that is configured to receive write data from a first device operating with a first local clock domain;
    a plurality of memory cells that receive and temporarily store the write data received from the input;
    an output that is configured to provide write data from the plurality of memory cells to a second device operating with a second local clock domain that is different from the first local clock domain;
    a frequency monitor that controls and monitors a difference between the first local clock domain and the second local clock domain and, based on the difference, determines whether to instruct a pointer movement controller to adjust one or both of a write pointer and a read pointer for the plurality of memory cells, thereby allowing the elastic gear FIFO buffer to balance data flowing from the input to the output; and
    an elastic reset module that initializes a virtual depth for the plurality of memory cells, wherein the elastic reset module comprises a read reset control and a write reset control, wherein the read reset control include a domain synchronization module and a delay module with a configurable delay.

2. The elastic gear FIFO buffer of claim 1, wherein the frequency monitor comprises a write counter and a read counter, wherein the write counter counts starting from zero and increases by one every one write clock cycle in the first local clock domain, wherein the read counter counts starting at zero and increases by one every read clock cycle in the second local clock domain.

3. The elastic gear FIFO buffer of claim 2, wherein the write counter counts to m−1, where m is a function of read clock frequency in the second local clock domain and a greatest common divider between the read clock frequency and write clock frequency in the first local clock domain.

4. The elastic gear FIFO buffer of claim 3, wherein the read counter counts to n−1, where n is a function of the write clock frequency and the greatest common divider between the read clock frequency and the write clock frequency.

5. The elastic gear FIFO buffer of claim 4, wherein m−1 corresponds to a write counter maximum value, wherein n−1 corresponds to a read counter maximum value, and wherein the write counter is mapped to at least one of Gray code and reduced Gray code before being transferred to the second local clock domain.

6. The elastic gear FIFO buffer of claim 5, wherein the write counter, once transferred to the second local clock domain, is evaluated every time the read pointer reaches zero, and wherein evaluation of the write counter results in a calculation of a clock frequency drift to determine whether the write pointer or read pointer requires an adjustment.

7. The elastic gear FIFO buffer of claim 1, wherein the elastic reset module is configured to implement a reset of at least one of the read pointer and write pointer and after the at least one of the read pointer and write pointer have been reset, the elastic reset module communicate the virtual depth to the frequency monitor for balancing the plurality of memory cells.

8. A system for transferring data from a first device operating with a first local clock domain to a second device operating with a second local clock domain, the system comprising:
a First-in-First-out (FIFO) buffer comprising a plurality of buffer memory cells;
a first input configured to receive information regarding a clock frequency in the first local clock domain;
a second input configured to receive information regarding a clock frequency in the second local clock domain;
a frequency monitor that transfers a clock frequency monitored result in the first local clock domain into the second local clock domain so that the clock frequency monitored result in the first local clock domain compares to the clock frequency in the second local clock domain and, based on the comparison, determines whether to instruct a pointer movement controller to adjust at least one of a read pointer and write pointer; and
an elastic reset that controls a FIFO initialize virtual depth, wherein the FIFO initialize virtual depth is configurable so that data latency through the FIFO initialize virtual depth is optimized on both a data width conversion between the first device and second device as well as a clock frequency tolerance design requirements, and wherein the frequency monitor is further configured to determine whether to instruct the pointer movement controller to adjust the at least one of a read pointer and write pointer based on the FIFO initialize virtual depth.

9. The system of claim 8, wherein the frequency monitor comprises a write counter and a read counter, wherein the write counter counts starting from zero and increases by one every one write clock cycle in the first local clock domain, wherein the read counter counts starting at zero and increases by one every read clock cycle in the second local clock domain, wherein the write counter counts to m−1, where m is a function of read clock frequency in the second local clock domain and a greatest common divider between the read clock frequency and write clock frequency in the first local clock domain, wherein the read counter counts to n−1, where n is a function of the write clock frequency and the greatest common divider between the read clock frequency and the write clock frequency, wherein m−1 corresponds to a write counter maximum value, wherein n−1 corresponds to a read counter maximum value, and wherein the write counter is mapped to at least one of Gray code and reduced Gray code before being transferred to the second local clock domain.

10. The system of claim 9, wherein the write counter, once transferred to the second local clock domain, is evaluated every time the read pointer reaches zero, and wherein evaluation of the write counter results in a calculation of a clock frequency drift to determine whether the write pointer or read pointer requires an adjustment.

11. A method of transferring data from a first device operating with a first local clock domain to a second device operating with a second local clock domain, the method comprising:
receiving data in a First-in-First-out (FIFO) buffer, wherein the received data is received from the first device;
temporarily storing the received data in the FIFO buffer;
reading the data stored from the FIFO buffer according to an order in which the data was received in the FIFO buffer, wherein the data is read to the second device;
monitoring a clock frequency in the first local clock domain;
monitoring a clock frequency in the second local clock domain;
transferring a clock frequency monitored result in the first local clock domain into the second local clock domain;
comparing the transferred clock frequency monitored result from the first local clock domain with the clock frequency in the second local clock domain;
based on the comparison, determining whether to instruct a pointer movement controller to increment at least one of a read pointer and write pointer to balance the FIFO buffer;
using an elastic reset to control a FIFO initialize virtual depth, wherein the FIFO initialize virtual depth is configurable so that data latency through the FIFO initialize virtual depth is optimized based on both a data width conversion between the first device and second device as well as clock frequency tolerance design requirements; and
determining, with the frequency monitor, whether or not to instruct the pointer movement controller to adjust the at least one of a read pointer and write pointer based on the FIFO initialize virtual depth.

12. The method of claim 11, wherein the clock frequency in the first local clock domain is different from the clock frequency in the second local clock domain.

13. The method of claim 11, wherein the pointer movement controller is provided with a gap move request instruction is response to determining that the clock frequency in the first local clock domain is drifting relative to the clock frequency in the second local clock domain.

14. The method of claim 11, wherein the data received in the FIFO buffer is received at a different data width than the data is read out of the FIFO buffer.

15. The method of claim 11, further comprising utilizing an elastic reset module to control a virtual depth of the FIFO buffer, wherein the determination of whether to instruct the pointer movement controller is also based on the virtual depth of the FIFO buffer.

16. An elastic gear First-in-First-out (FIFO) buffer, comprising:
- an input that is configured to receive write data from a first device operating with a first local clock domain;
- a plurality of memory cells that receive and temporarily store the write data received from the input;
- an output that is configured to provide write data from the plurality of memory cells to a second device operating with a second local clock domain that is different from the first local clock domain; and
- a frequency monitor that monitors a difference between the first local clock domain and the second local clock domain and, based on the difference, determines whether to instruct a pointer movement controller to adjust one or both of a write pointer and a read pointer for the plurality of memory cells, thereby allowing the elastic gear FIFO buffer to balance data flowing from the input to the output, wherein the frequency monitor comprises a write counter and a read counter, wherein the write counter counts starting from zero and increases by one every one write clock cycle in the first local clock domain, wherein the read counter counts starting at zero and increases by one every read clock cycle in the second local clock domain, and wherein the write counter counts to m−1, where m is a function of read clock frequency in the second local clock domain and a greatest common divider between the read clock frequency and write clock frequency in the first local clock domain.

17. The elastic gear FIFO buffer of claim 16, wherein the read counter counts to n−1, where n is a function of the write clock frequency and the greatest common divider between the read clock frequency and the write clock frequency.

18. The elastic gear FIFO buffer of claim 17, wherein m−1 corresponds to a write counter maximum value, wherein n−1 corresponds to a read counter maximum value.

19. The elastic gear FIFO buffer of claim 18, wherein the write counter is mapped to at least one of Gray code and reduced Gray code before being transferred to the second local clock domain.

20. The elastic gear FIFO buffer of claim 19, wherein the write counter, once transferred to the second local clock domain, is evaluated every time the read pointer reaches zero, and wherein evaluation of the write counter results in a calculation of a clock frequency drift to determine whether the write pointer or read pointer requires an adjustment.

* * * * *